United States Patent
Cirillo

(10) Patent No.: US 11,343,240 B2
(45) Date of Patent: May 24, 2022

(54) MULTI-USER TEST SYSTEM AND METHOD FOR CONFIGURING A MULTI-USER TEST SYSTEM

(71) Applicant: Rohde & Schwarz GmbH & Co. KG, Munich (DE)

(72) Inventor: Luke Cirillo, Poing (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 109 days.

(21) Appl. No.: 16/753,900

(22) PCT Filed: Oct. 10, 2018

(86) PCT No.: PCT/EP2018/077591
§ 371 (c)(1),
(2) Date: Apr. 6, 2020

(87) PCT Pub. No.: WO2019/072910
PCT Pub. Date: Apr. 18, 2019

(65) Prior Publication Data
US 2020/0265127 A1    Aug. 20, 2020

(30) Foreign Application Priority Data
Oct. 12, 2017    (DE) .......................... 102017218296.2

(51) Int. Cl.
*G06F 21/31*    (2013.01)
*H04L 9/40*    (2022.01)
*G06F 16/245*    (2019.01)

(52) U.S. Cl.
CPC ........ *H04L 63/0853* (2013.01); *G06F 16/245* (2019.01); *G06F 21/31* (2013.01);
(Continued)

(58) Field of Classification Search
CPC ............. H04L 63/0853; H04L 63/0428; H04L 63/083; H04L 63/102; H04L 63/105; H04L 63/1416; G06F 16/245; G06F 21/31
See application file for complete search history.

(56) References Cited

U.S. PATENT DOCUMENTS 8,474,027 B2 *  6/2013  Meijer .................... H04L 63/10
                                                              726/9
9,032,360 B1    5/2015  Cohen et al.
(Continued)

FOREIGN PATENT DOCUMENTS

CA         2896643 A1    7/2014
CN      101871973 A     10/2010
(Continued)

OTHER PUBLICATIONS

European International Search Report, English translation of ISR and Written Opinion for International Application No. PCT/EP2018/077591, dated Apr. 18, 2019, 22 pages.
(Continued)

*Primary Examiner* — Tongoc Tran
(74) *Attorney, Agent, or Firm* — Westman, Champlin & Koehler, P.A.

(57) ABSTRACT

The present invention relates to the automatic configuration of a measuring and test device in a multi-user test system. Individual users are initially authenticated. An individual user profile can be generated for authenticated users. The individual user profile can be stored in a user database. After authentication of a user, the user profile can be read-out from the profile database and then a measuring and test device can then be automatically adjusted corresponding to the user profile.

12 Claims, 2 Drawing Sheets

(52) U.S. Cl.
CPC ........ *H04L 63/0428* (2013.01); *H04L 63/083* (2013.01); *H04L 63/0861* (2013.01); *H04L 63/102* (2013.01); *H04L 63/105* (2013.01); *H04L 63/1416* (2013.01)

(56) References Cited

U.S. PATENT DOCUMENTS

| | | | |
|---|---|---|---|
| 9,165,133 B2* | 10/2015 | La Fever | G06F 12/1408 |
| 9,218,470 B2 | 12/2015 | Domke et al. | |
| 9,721,080 B2* | 8/2017 | Moran | G06K 9/00973 |
| 10,996,308 B2* | 5/2021 | Cheng | G01R 35/00 |
| 11,090,569 B1* | 8/2021 | Wu | G06F 21/31 |
| 11,216,285 B2 | 1/2022 | Cheng et al. | |
| 2003/0018910 A1* | 1/2003 | Wert | G06F 21/6218 726/27 |
| 2003/0036871 A1 | 2/2003 | Fuller, III et al. | |
| 2006/0265094 A1* | 11/2006 | Numata | G01N 29/265 700/110 |
| 2006/0282660 A1 | 12/2006 | Varghese et al. | |
| 2009/0165089 A1* | 6/2009 | Bennett | G06F 21/41 726/3 |
| 2010/0212001 A1* | 8/2010 | Kashyap | H04N 21/42204 726/7 |
| 2011/0302630 A1* | 12/2011 | Nair | G06F 21/41 726/4 |
| 2013/0028478 A1* | 1/2013 | St-Pierre | G01B 11/002 382/103 |
| 2014/0189851 A1 | 7/2014 | Domke et al. | |
| 2015/0205623 A1 | 7/2015 | DiVincent et al. | |

FOREIGN PATENT DOCUMENTS

| | | |
|---|---|---|
| DE | 102005042830 A1 | 3/2007 |
| DE | 102014007882 A1 | 11/2015 |

OTHER PUBLICATIONS

International Search Report and Written Opinion for International Application No. PCT/EP2018/077591, dated Feb. 4, 2019, 13 pages.

* cited by examiner

MULTI-USER TEST SYSTEM AND METHOD FOR CONFIGURING A MULTI-USER TEST SYSTEM

CROSS-REFERENCE TO RELATED APPLICATION

This application is a Section 371 National Stage Application of International Application No. PCT/EP2018/077591, filed on Oct. 10, 2018, entitled "MULTI-USER TEST SYSTEM AND METHOD FOR CONFIGURING A MULTI-USER TEST SYSTEM", which published as WO 2019/072910 A1, on Apr. 18, 2019, and claims priority to German Patent Application No. 102017218296.2, filed on Oct. 12, 2017, the contents of which are incorporated herein by reference in their entireties.

The present invention relates to a multi-user test system and a method for configuring a multi-user test system.

TECHNICAL BACKGROUND

Although the present invention can be applied to any multi-user test system, the present invention and the problem addressed thereby will be described hereinafter in conjunction with an electrical measuring device, such as e.g. a network analyser.

Modern electronic test systems have a multiplicity of configuration options which are, in part, very complex. For example, a multiplicity of different parameters can be configured on a device such as a network analyser. Furthermore, there is also the possibility of also individually adapting the graphical user interface to the wishes and requirements of a user in the case of complex displays on such a test device. For this purpose, complex and also time-intensive configurations of the respective devices are generally necessary.

However, since such modern and complex test devices are generally very expensive, these devices are generally available only in limited numbers. In many cases, for effective utilisation of the devices, the devices are thus shared by several users. The individual users can execute different test processes on the same device, said processes also requiring different settings of a device accordingly. Furthermore, the different users can also have different requirements in terms of the configuration of a graphical user interface or the like.

Owing to the complexity of the devices, the adjustment of the respective device thus requires a great deal of outlay when changing the user.

Against this background, it is an object of the present invention to allow configuration of a measuring and test device which is as simple, rapid and reliable as possible, in order to consider the different requirements of different users.

DISCLOSURE OF THE INVENTION

The present invention discloses a multi-user test system having the features of claim 1 and a method for configuring a multi-user test system having the features of claim 9.

Accordingly, the following is provided:

A multi-user test system having a measuring and test device, an authentication device, a profile database and a control device. The measuring and test device is configured to execute predetermined measuring and test operations. The authentication device is configured to authenticate a user. The profile database is configured to store and provide user profiles. The control device is configured to generate a user profile for an authenticated user and store same in the profile database. The control device is also configured to read-out a user profile for an authenticated user from the profile database and thereupon automatically adjust the measuring and test device using the read-out user profile.

The following is also provided:

A method for configuring a multi-user test system. The method includes the steps of authenticating a user, reading-out a user profile of the authenticated user, in particular from a profile database, and adjusting a measuring and test device using the read-out user profile. In particular, the measuring and test device is automatically adjusted after the user is authenticated.

The knowledge forming the basis of the present invention is that modern measuring and test devices generally have a multiplicity of complex configuration and setting options. Several users operating the same device can possibly have different requirements in terms of configuration, parametrisation and adjustment of the measuring and test device. In particular, several users possibly have different preferences or requirements in terms of displaying the graphical user interface of such a measuring and test device. Owing to the multiplicity of setting and configuration options, a change in user and the thus associated reconfiguration tasks represents a large outlay in terms of time which may possibly also be associated with a multiplicity of error sources.

Therefore, the concept addressed by the present invention is to take this knowledge into account and permit a simple, rapid and reliable configuration of a measuring and text device in a multi-user test system. For this purpose, provision is made to allocate individual user profiles to the individual users of the multi-user test system, which profiles comprise the settings and configurations of the respective user on one or more measuring and test devices. These can be stored in a local or central profile database and can be retrieved as required.

The individualisation of the user profiles stored in the profile database is linked with an authentication of a user. Owing to such an authentication of the users, it can be ensured that the user profiles stored in the profile database are each allocated to the correct users and are not altered or manipulated by other users accidentally or intentionally.

The components of the multi-user test system, in particular the measuring and test device, the authentication device, the profile database and the control device can be provided in a common unit, in particular in a common device. However, it is also possible that one or more of the components are arranged spatially distributed at different locations. In particular, e.g. a common profile database can also be provided for any number of one or more measuring and test devices. The individual components of the multi-user test system can communicate with each other e.g. via suitable interfaces. Wired communication paths are just as possible as wireless communication via suitable radio interfaces. In particular, e.g. wireless communication by means of WLAN, mobile radio, Bluetooth or any other wireless communication standard is possible.

The measuring and test device can be any device which can perform measurement processes and/or can provide test signals. In particular, the measuring and test device can detect and evaluate e.g. any electrical, electro-magnetic and/or optical signals. Furthermore, the measuring and test device can likewise generate and emit any electrical, electro-magnetic and/or optical signals. Furthermore, any further measuring and test devices for performing test options, in particular in relation to electrical and electro-magnetic tests, are likewise possible.

The user profiles stored in the profile database can comprise any information which is associated with configuration, parametrisation or adjustment of the measuring and test device. For example, a complete configuration of a measuring and test device, as has been set by a user at an earlier point in time, can be stored in a user profile. Furthermore, the user profile can possibly also comprise only one configuration of a graphical user interface in order to adapt the graphical user interface to the habits of the user. Furthermore, the user profile can possibly also comprise instructions for complex measurement processes, e.g. in the form of a script or the like. Algorithms or calculation specifications defined in a user-specific manner which have been specified by a user can also be defined in a user profile. Furthermore, user-specific limitations or restrictions can possibly also be specified in a user profile as required. For instance, individual functions of the measuring and test device can be enabled, limited or prevented e.g. in the user profile individually. In this manner, for example narrower specifications can be defined for a still-inexperienced user in order to avoid any possible damage to the measuring and test device or a test object. Individual functions can also be limited in a user-specific manner possibly for licensing reasons. Furthermore, of course any other limitations, parametrisations or definitions in the use profiles for a respective user are possible.

The control device of the multi-user test system can in particular automatically read-out the respective user profile from the profile database after a new user has been authenticated, and thereupon can immediately configure the measuring and test device. In this manner, a user—immediately after he has been authenticated—will be presented with the measuring and test device in the form usual to him with the required settings, without further interactions being necessary. Optionally, several user profiles or several different settings within a user profile can also be defined for a user. In this case, the possible setting variations can be displayed to the user immediately after authentication, and so a user only has to select from among these setting variations in order to immediately arrive at the desired configuration of the measuring and test device.

Furthermore, it is also possible to automatically store the settings of a user in the user profile stored in the profile database. For example, when an authenticated user logs-off, the current configuration is automatically stored in the user profile. In the event of a change of user, i.e. when authenticating a new user, the configuration of the previously logged-on and authenticated user can also be automatically stored if need be. Furthermore, any other automatic storage of the configuration data, e.g. at predetermined points in time, within predetermined time intervals or the like, is also possible. It is understood that the reading-out and storing of the user profiles from the user database are not limited to the examples described above.

Further embodiments of the present invention are described in the dependent claims and the following description with reference to the accompanying drawings.

In one possible embodiment, the control device is configured to automatically read-out the user profile of the authenticated user after authentication of the user and to adjust the measuring and test device using the read-out user profile.

The authentication of the user is directly linked with the configuration of the measuring and test device and so immediately after the user has been authenticated the respective measuring and test device can be adjusted according to the information stored in the user profile. A user is thus presented with the respective measuring and test device after authentication immediately in the configuration he desires and can immediately begin working thereafter. In this manner, the time for configuring the measuring and test device is significantly reduced and possible errors owing to incorrect adjustment for a new configuration can be avoided. As already described above, several different settings can also possibly be stored in a user profile of an authenticated user. In this case, a user can select one of the possible settings after authentication which is then immediately automatically set in the respective measuring and test device.

Since the adjustment of the measuring and test device is directly linked with the authentication of a user, the configuration and the adjustment of the measuring and test device by another user can be avoided. In this manner, it can be ensured that a foreign user does not manipulate the settings of an authenticated user accidentally or perhaps even intentionally. Therefore, possible incorrect adjustments by other users can be avoided.

In one possible embodiment, the control device is configured to read-out configuration data of the measuring and test device. Then, the control device can generate a user profile using the read-out configuration data. The read-out configuration data can comprise a complete setting of the measuring and test device. In particular, the configuration of a possibly present graphical user interface can be included. Furthermore, any other parameters for the adjustment of the measuring and test device and possibly also information stored in possibly present buffers can also be stored in the respective user profile. However, it is also possible to limit the reading-out and storing of configuration data of the measuring and test device to specified information. For example, possibly only one configuration of the graphical user interface can be stored in the user profile whilst other configuration data are not linked with the user profile. In this manner, e.g. after authentication of the user the graphical user interface can be automatically adapted to the wishes of the user whilst the remaining settings are not altered even after authentication. Therefore, for example parametrisations of the measuring and test device possibly previously performed by another user can be retained whilst the representation of the graphical user interface is adapted to the wishes or requirements of the authenticated user. Of course, furthermore any other parts of the configuration data of a measuring and test device can also be stored in the user profile.

In one possible embodiment, the user profile includes settings for the graphical user interface, settings for a detection of measurement values, settings for generating measurement signals, parametrisation of calculation specifications, selecting of algorithms or scripts and/or a user-specific allocation of rights.

In this manner, the respective settings or requirements of a user can be stored in the user profile and retrieved as required and so the measuring and test device can be automatically adapted to the requirements of a user. In particular, processes, scripts or the like generated by a user can e.g. likewise also be stored in the user profile and retrieved as required. Therefore, immediately after authentication of the user, these data are likewise available at the respective measuring and test device. By way of an allocation of rights in the user profile, it is possible to limit the functional scope of the measuring and test device. In particular, the measuring and test device can hereby be adapted e.g. to the knowledge or level of training of a user. It can hereby be ensured that an inexperienced user does not cause damage to the measuring and test device or a connected component possibly by way of an erroneous adjustment. Optionally, it is also possible by way of the allocation of rights to limit the configuration of the measuring and test device by a particular user to specified parameters or to provide only standard values for other specified parameters if need be.

In one possible embodiment, the authentication device is configured to authenticate a user by means of a user name and password. Furthermore, the authentication device can also perform authentication on the basis of a biometric authentication, in particular based on a fingerprint, face recognition, iris scan, voice recognition or the like. Furthermore, authentication by means of a physical access key, e.g. a dongle, USB stick having a user-specific file or the like, is also possible. Furthermore, the authentication can also be effected by means of a user-specific access code or the like. Of course, any other options for authenticating a user are also additionally possible. However, if the authentication of a user is not to be particularly protected, then inputting a user name or identifier without further safety measures is also possible if need be.

In one possible embodiment, the control device is configured to limit settings of the measuring and test device in dependence upon an allocation of rights in the user profile. For example, in dependence upon the allocation of rights in the user profile individual functions of the measuring and test device can be blocked, enabled or only enabled in a limited manner, or it is possible to limit the parametrisation of a measuring process or for the generation of a measurement signal to specified limits. Furthermore, of course any other limitations or enablements are also possible in dependence upon an allocation of rights in the user profile.

In one possible embodiment, the multi-user test system comprises an administration device. The administration device can be configured to read-out a user profile from a profile database, to modify the user profile and/or to store the user profile in the profile database. In this manner, the information stored in the user profile can also be adapted by the additional administration device without a direct connection of the measuring and test device. Furthermore, other specifications or limitations in the user profile can optionally also be stored by means of the administration device, which optionally also cannot be performed directly at the measuring and test device.

In one possible embodiment, the administration device is configured to modify a plurality of user profiles collectively.

For example, several user profiles can also be allocated to a common group and so common adjustments can be performed for such a group of users. In this manner, a particularly efficient and rapid configuration of several user profiles can be performed. Furthermore, it is e.g. also possible to copy a user profile, to move a user profile from one user group to another user group or to perform further modifications in the user profile.

However, the multi-user test system is not limited to an individual measuring and test device. Rather, it is also possible to provide any number of one or more measuring and test devices. In this case, all the measuring and test devices of the multi-user test system can possibly access a common profile database. Therefore, e.g. all the measuring and test devices of the multi-user test system can be automatically configured corresponding to the information stored in the user profile. Therefore, it is e.g. possible that a user is working with a first measuring and test device at a first point in time. The user can be authenticated at a further measuring and test device at a subsequent point in time. Then, the settings are automatically read-out from the profile database and are set at this further measuring and test device, and so the user is also presented with his usual configuration at the further measuring and test device. The multi-user test system is also not limited to several identical measuring and test devices. Rather, it is also possible to use several measuring and test devices, which are different at least in part, in a multi-user test system. Optionally, at least some of the individual measuring and test devices can be designed identically or similarly. In particular, in the case of several measuring and test devices which are otherwise different, displays having a graphical user interface can be provided for example. In this case, e.g. the specification for the graphical user interface can be read-out from the user profile and the respective graphical user interface of the corresponding measuring and test device can then be adapted according to the user specifications.

In one possible embodiment of the method for configuring a multi-user test system, the method further comprises the steps of reading-out a configuration of the measuring and test device, generating a user profile using the read-out configuration and storing the user profile in a profile database.

The above embodiments and developments can be combined with each other in any manner if it is useful to do so. Further embodiments, developments and implementations of the invention also comprise non-explicitly-mentioned combinations of features of the invention which have been described or will be described hereinafter with reference to the exemplified embodiments. In particular, a person skilled in the art will also add individual aspects as improvements or complements to the respective basic form of the invention.

BRIEF DESCRIPTION OF THE DRAWINGS

The present invention will be explained in more detail hereinafter with the aid of the exemplified embodiments shown in the schematic figures of the drawings. In the drawings.

EMBODIMENTS OF THE INVENTION

Figure 1:
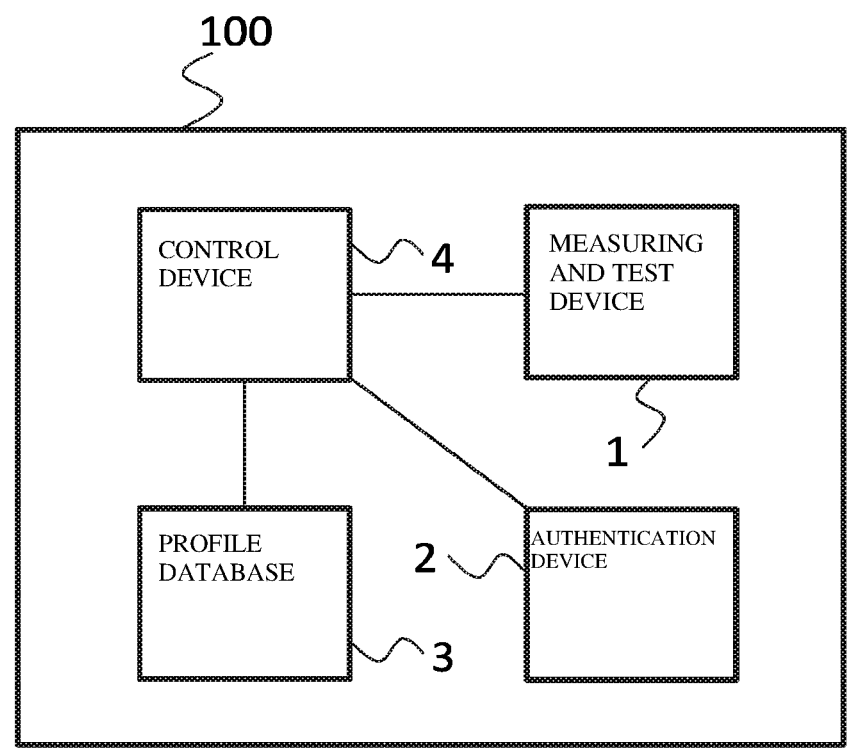
FIG. 1: shows a schematic illustration of a multi-user test system according to one embodiment.

FIG. 1 shows a block diagram of a multi-user test system 100 according to one embodiment. The multi-user test system comprises a number of one or more measuring and test devices 1. The multi-user test system 100 further comprises a number of one or more authentication devices 2 and control devices 4. Furthermore, the multi-user test system 100 comprises at least one profile database 3. In particular, a separate authentication device 2 and a separate control device 4 can be provided for each measuring and test device 1. The measuring and test device 1, authentication device 2, profile database 3 and control device 4 can be provided in a common unit as a common device. However, it is also possible that the individual components, in particular the profile database 3, are arranged spatially separate from each other. The individual components can communicate with other in a wired or wireless manner via any communication interfaces.

A user can be authenticated at the authentication device 2 by means of any suitable method. For example, the user can log-on by means of a user name and a corresponding password. Authentication by means of a specific code sequence (e.g. a personal identification number, PIN) or the like is possible. Furthermore, a physical authentication element, such as e.g. a dongle, a USB stick having a user-specific file or the like can be used for authentication purposes. Furthermore, any biometric authentication methods, such as e.g. a fingerprint scanner, face recognition, iris recognition, voice recognition or the like are also possible. Furthermore, of course any other methods for authenticating a user are also possible. If the data does not need to be particularly protected, it is possibly also sufficient that the user is authenticated only by inputting a user name or another user-specific identification or the like.

A user can perform any user-specific adjustments during operation of a measuring and test device 1. For example, he can adjust individual parameters on the measuring and test device 1 for a specified test task. Furthermore, he can optionally also generate any test processes, scripts or the like or can input same into the measuring and test device 1 by means of a data carrier, a network connection or the like. The inputting of calculation specifications, algorithms or any other data is also possible. For example, the user can also input personal notes in conjunction with the use of the measuring and test device and store same in the measuring and test device 1. Furthermore, the user can also perform individual adjustments on a graphical user interface of the measuring and test device 1. In this manner, the user can adapt the measuring and test device 1 in a quite individualised manner to his personal requirements.

The control device 4 can read-out the settings performed by the user in the measuring and test device 1 and generate an individual user profile for the authenticated user on the basis of these read-out data. All of the data read-out by the control device 4 can optionally be stored in the user profile. However, it is also possible to limit the user profile to a particular partial region. For example, only the configurations of the graphical user interface can be read-out and stored in the user profile. Furthermore, any other parts such as e.g. personal notes, individual scripts for a process or the like can also be read-out and stored in the user profile. Furthermore, any other parts of the configuration or the data stored in the measuring and test device can also be included in the user profile. In particular, optionally specific rights can also be allocated to a user and so the user is possibly only limited to some or all functions of the measuring and test device 1, or cannot perform said functions at all. Furthermore, the user profile can also comprise any other information. After the control device 4 has generated a user profile for an authenticated user, this user profile, possibly together with the authentication data of the user, can be stored in the profile database 3. The user profile can be stored in any suitable form, e.g. as a text file, as a compressed binary file or the like. As required, the user profile can also be stored in encrypted form in the profile database 3.

Optionally, the user profiles stored in the profile database 3 can also be accessed by means of a further administration device (not illustrated in this case). In this manner, the individual user profiles can be managed, adapted and modified. In particular, adapting possible rights for a user, grouping several users in a common user group, copying a user profile for a user to be newly generated or the like is also possible.

If a user logs onto a measuring and test device 1 by means of an authentication device 2, for which user a user profile is already stored in the profile database 3, then the control device 4 can automatically read-out the corresponding user profile from the profile database 3 for such an authenticated user. After the control device 4 has read-out a user profile of an authenticated user from the profile database 3, the control device 4 can evaluate the user profile and then configure the respective measuring and test device 1 using the information stored in the user profile. For example, after authentication of a user, the measuring and test device can thus be completely configured as per the state in which it was left when the user last used it. Therefore, the measuring and test device 1 is available to a user immediately after authentication in a state adapted for him, even if in the meantime one or more other users have made modifications to the measuring and test device 1.

The control device 4 can, after authentication of a user, adjust and configure the measuring and test device 1 corresponding to the user profile stored in the profile database 3. The adjustment can also comprise in particular the adaptation of a graphical user interface. Therefore, the user immediately gets his bearings with the correspondingly adapted graphical user interface of the measuring and test device 1. Other user-specific data can also be taken from the user profile and automatically adjusted at the measuring and test device 1 by the control device 4 after authentication. For example, user-specific scripts or test processes, personal notes in relation to test processes, parametrisations of a measuring and test device 1 or the like can be stored in the user profile and so this information is evaluated by the control device 4 in order to immediately automatically adapt the measuring and test device 1 accordingly after authentication.

If the multi-user test system 100 comprises several measuring and test devices 1, then user-specific settings can also be taken from the user profile from a first measuring and test device 1 to another measuring and test device 1. Therefore, a user is not bound to a single measuring and test device 1 but rather can change between several identical or similar measuring and test devices 1.

Even if the multi-user test system 100 comprises several different measuring and test devices 1, then if need be at least some of the information stored in the user profile can be taken for configuring the respective measuring and test device 1. For instance, e.g. even in the case of different measuring and test devices 1, the respective graphical user interfaces can be adapted to the configurations stored in the user profile. Therefore, the user also has a unitary or at least approximately unitary graphical user interface, even in the case of several different measuring and test devices, whereby the use of the respective measuring and test device 1 can be made significantly easier.

Figure 2:
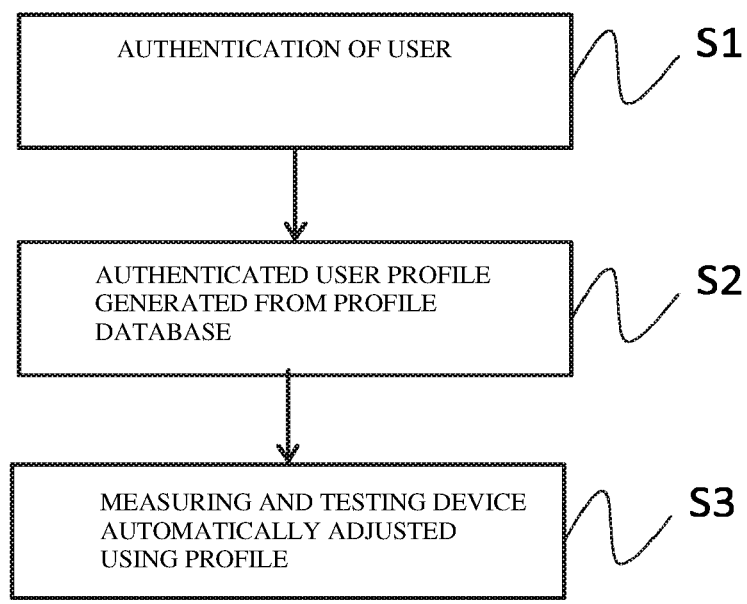
FIG. 2: shows a flow diagram as used by a method for configuring a multi-user test system according to one embodiment.

FIG. 2 shows a flow diagram as used by a method for configuring a multi-user test system according to one embodiment.

In step S1, a user is authenticated. The authentication can be effected in any manner as already described above. In step S2, a user profile of an authenticated user is read-out from a profile database 3. In step S3, a measuring and test device 1 is then automatically adjusted using the read-out user profile.

Furthermore, the method can also comprise a step for reading-out a configuration of the measuring and test device 1. A user profile can be generated using the read-out configuration of the measuring and test device 1, and the user profile can then be stored in a profile database 3.

In summary, the present invention relates to an automatic configuration of a measuring and test device in a multi-user test system. Individual users are initially authenticated. An individual user profile can be generated for authenticated users. The individual user profile can be stored in a user database. After authentication of a user, the user profile can be read-out from the profile database and then a measuring and test device can then be automatically adjusted corresponding to the user profile.

The invention claimed is:

1. Multi-user test system, comprising:
a measuring and test device which is configured to execute predetermined measuring and test operations;
an authentication device which is configured to authenticate a user;
a profile database which is configured to store and provide user profiles; and
a control device which is configured to generate a user profile for an authenticated user and store same in the profile database and to read-out a user profile for an authenticated user from the profile database and to adjust the measuring and test device using the read-out user profile,
wherein the user profile of the authenticated user comprises information which is associated with configuration, parametrization and adjustment of the measuring and test device, as set by the authenticated user at an earlier point in time wherein the user profile includes several different settings for the authenticated user, and the possible setting variations are displayed to the authenticated user.

2. Multi-user test system of claim 1, wherein the control device is configured to automatically read-out the user profile of an authenticated user after authentication of the user and to adjust the measuring and test device using the read-out user profile.

3. Multi-user test system of claim 1, wherein the control device is configured to read-out configuration data of the measuring and test device and to adjust a user profile using the read-out configuration data.

4. Multi-user test system of claim 1, wherein the user profile comprises at least one of:
a setting for detecting measurement values,
a setting for generating measurement signals,
a setting for parametrisation of calculation specifications,
a setting for selecting algorithms,
a setting for an allocation of rights.

5. Multi-user test system of claim 1, wherein the authentication device is configured to perform the authentication by means of at least one of:
a user name and password,
biometric authentication,
authentication by means of a physical access key,
authentication by means of an access code.

6. Multi-user test system of claim 1, wherein the control device is configured to limit adjustments of the measuring and test device in dependence upon an allocation of rights in the user profile.

7. Multi-user test system of claim 1, having an administration device which is configured to read-out a user profile from the profile database.

8. Multi-user test system of claim 1, having an administration device which is configured to modify a user profile.

9. Multi-user test system of claim 8, wherein the administration device is configured to modify a plurality of user profiles collectively.

10. Multi-user test system of claim 1, having an administration device which is configured to store a user profile in the profile database.

11. Method for configuring a multi-user test system, the method comprising the steps of:
authenticating a user;
reading-out a user profile of the authenticated user; and
adjusting a measuring and test device using the read-out user profile,
wherein the user profile of the authenticated user comprises information which is associated with configuration, parametrization and adjustment of the measuring and test device, as set by the authenticated user at an earlier point in time wherein the user profile includes several different settings for the authenticated user, and the possible setting variations are displayed to the authenticated user.

12. Method as claimed in claim 1, comprising the steps of:
reading-out a configuration of the measuring and test device;
generating a user profile using the read-out configuration; and
storing the user profile in a profile database.

* * * * *